April 12, 1949.   F. A. FRISWOLD ET AL   2,466,696
DEW POINT HYGROMETER
Filed Sept. 25, 1945
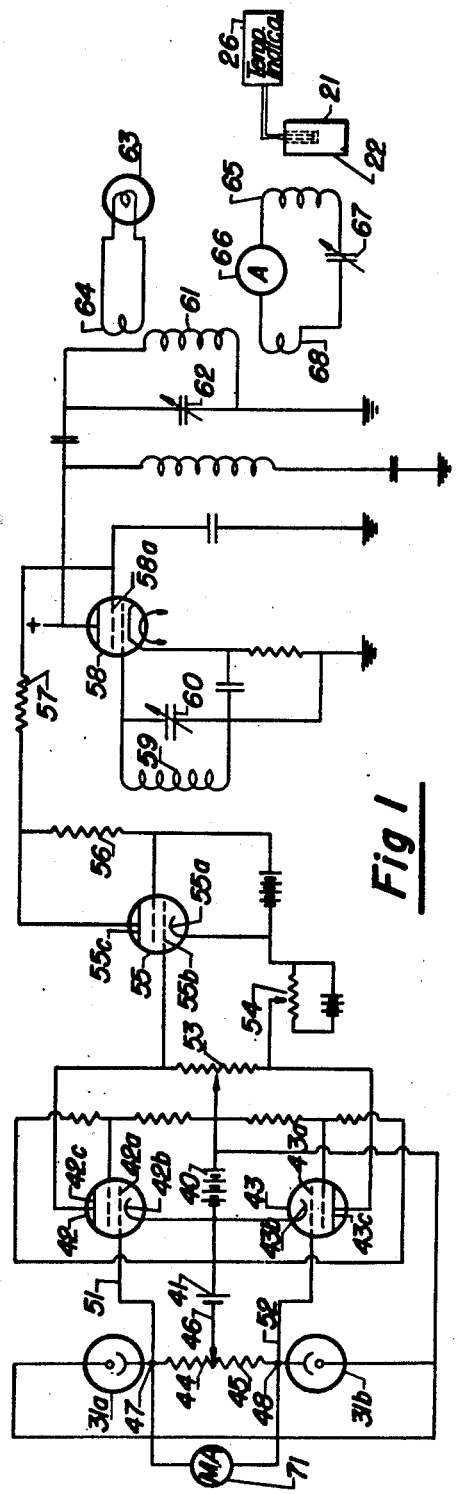
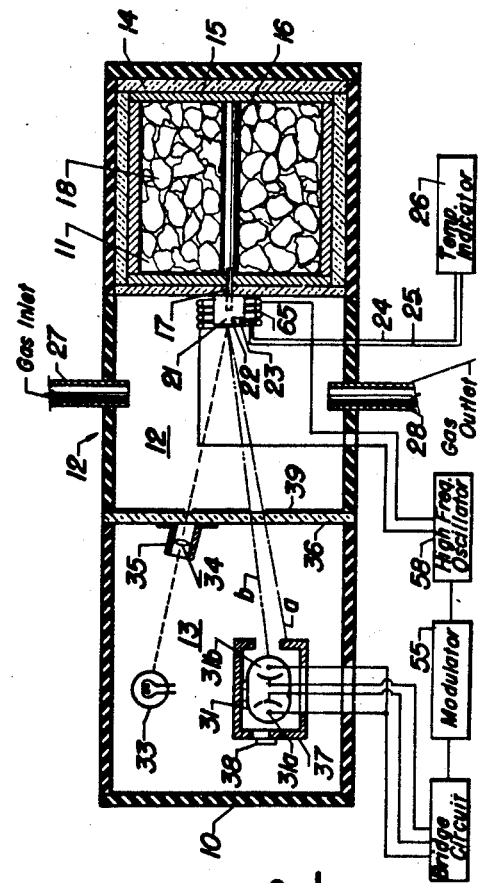
Inventor
Frank A. Friswold
Ralph D. Lewis
By Ralph L Chappell
Attorney Patented Apr. 12, 1949

2,466,696

UNITED STATES PATENT OFFICE 2,466,696

DEW POINT HYGROMETER

Frank A. Friswold, Cleveland, and Ralph D. Lewis, Parma, Ohio

Application September 25, 1945, Serial No. 618,604

5 Claims. (Cl. 236—44)

(Granted under the act of March 3, 1883, as amended April 30, 1928; 370 O. G. 757)

This invention relates to hygrometer apparatus and in particular to such apparatus of the dew-point type.

The general object of the invention is to provide a hygrometer of the type referred to which is more stable and reliable in operation.

Another object is to provide a dew-point hygrometer in which thermal lag is reduced to a negligible factor, thereby improving its response characteristic to rapidly changing variations in humidity as is found in aeroplanes flying at high speeds through clouds, etc.

Another object is to provide a mirror type, dew-point hygrometer utilizing a novel photronic relay in which the average heater current for the mirror is not affected by changes in intensity of the light source associated with the photo-cell elements or by changes in operating voltages of the power supply source.

These and other objects of the invention will become more apparent from the detailed description to follow when considered with the accompanying drawings which illustrate a preferred embodiment of the invention.

In the drawings,

Fig. 1 is a schematic wiring diagram of the electrical circuits of our improved hygrometer; and Fig. 2 is a longitudinal section showing the relationship between the various operating components of the apparatus and illustrating the circuit components in block form.

Dew-point type hygrometers using a cold mirror to which heat is applied until the moisture thereon is evaporated and controlling the heater current for the mirror as a function of the amount of light from a light source which falls upon a photo-cell unit after reflection from the mirror are not broadly new. However, one disadvantage of this type of hygrometer prior to our improvement was that variations in intensity of the light source caused considerable changes in the temperature of the mirror thus introducing an error into the hygrometer, since humidity is determined as a function of the temperature of the mirror. Inasmuch as illumination varies as the eighth power of the filament current in an electric lamp, it is obvious that lack of proper current regulation can introduce serious errors. Aging effects in the lamp also are contributing factors.

Another disadvantage of hygrometer construction prior to our improvements was that the mirror temperature was subject to a considerable amount of "hunting." The source of heat was a resistor imbedded in the mirror head through which the heating current flowed. Because of the thermal lag of the mirror head and the large quantities of heat involved, a serious hunting effect took place when the dew-point changed. It was not unusual to observe a five minute lag period during which equilibrium conditions were being re-established. This hunting effect made the determination of the dew-point difficult, especially under operating conditions where it is sought to record rapidly changing humidity conditions such as is experienced in aircraft flight.

From the description of our improved hygrometer construction which now follows, it will become apparent that the above referred to disadvantages are all overcome. Referring now to the drawings, there is included a box 10 of Bakelite divided into three sections; a coolant compartment or heat sink 11, a mirror compartment 12, and a photo-cell compartment 13.

To the Bakelite walls 10 of coolant compartment 11 are secured inner walls 14 of insulation material such as a balsa which are lined with bronze sheeting 15. The coolant compartment 11 is covered with a close-fitting lid also of Bakelite and balsa lined with sheet bronze. This lid is not shown because the details of construction of box 10 do not constitute the invention claimed in this application. A copper rod 16 of ½" diameter runs the length of the compartment 11 near the bottom and is soldered at each end to the bronze sheeting 15. A smaller copper rod 17 of ⅛" diameter is set in a hole provided in one end of rod 16 and extends through the balsa wall 14 to the mirror compartment 12. When the hygrometer is in use, compartment 11 is filled with $CO_2$ 18 or any other suitable type of refrigerant. Rods 16, 17 and the $CO_2$ 18 thus constitute a heat sink or heat absorber for pulling down, by conduction, the temperature of the mirror element. The latter is constituted by a nickel cap 21 of ¼" diameter fitted on the end of the small rod 17, and which is polished on one face 22 to act as the mirror. Nickel is preferred as the material for the cap 21 in view of its favorable resistivity, thermal conductivity, magnetic characteristics, and its ability to take a high polish.

Cap 21 has a very small hole drilled into it from the side just beneath the surface 22. Into this hole there is inserted a 32 gage iron-constantan thermocouple 23. Thermocouple 23 is connected via conductors 24, 25 to a temperature measuring device 26 of conventional construction to thereby measure the temperature of the mirrored face 22 of the cap 21.

The seams of Bakelite walls 18 defining the mirror compartment 12 are sealed with Permatex to make the compartment leak-proof. A Lucite window (not shown) may be located near the top of this compartment to permit observation of the mirrored cap member 21. When the instrument is in use, this window is covered with a Bakelite lid to keep out stray light. Brass tubing connections 27, 28, which extend through opposite walls of compartment 12 to the interior thereof, serve as inlet and outlet, respectively, for the air under humidity test.

The photo-cell compartment 13 contains a type 920 photocell 31 which is comprised of two photo-sensitive cell units 31a and 31b. Also included in this compartment is a 32-candle power lamp 33 and a lens system 34 supported within a tubular housing 35 that is secured to a wall 36 of transparent plastic such as Lucite for separating compartments 12 from 13. Light from lamp 33 is focused by lens 34 onto the mirrored face 22 of cap 21 and is reflected back through wall 36 towards the photo-cell 31b. A cover member 37 is provided over the twin photo-cell unit 31 so that all direct light from the lamp 33 as distinguished from that reflected from the mirrored face 22, has no effect on the photo-cell unit 31. However, cover 37 is provided with a slidably mounted door 38 cooperative with an opening in the cover to permit a small amount of light to fall on photo-cell 31a. This arrangement is desirable to permit better balancing of the bridge circuit in which the photo-cells 31a and 31b are connected. The Lucite wall 36 is covered with an opaque coating 39 except where it is necessary for the direct and reflected light rays to pass through.

The electronic components of our improved hygrometer are shown in the circuit diagram of Fig. 1. In this diagram, it is seen that photo-cells 31a and 31b are connected in a Wheatstone bridge which includes a battery 40 which functions as a power source for the bridge, another battery 41 which supplies a grid biasing potential for a pair of amplifier tubes 42, 43, resistor 44 and resistor 45. One arm of the bridge network consists of photo-cell 31b and resistor 45, and the other branch of the bridge network is constituted by photo-cell 31a and resistor 44. Initially, the photo-cell 31a and 31b are so arranged that with no condensation of air on the mirrored face 22 of cap 21, the beam of light from the lamp 33 when reflected by the mirrored face 22 will pass by the edge of photo-cell 31b along path a. Contact arm 46 is then adjusted until the voltage drop across resistance 44 is equal to the drop across the resistance 45. Door 38 is adjustable to balance the amount of strap light falling on the photo-cells 31a and 31b. Under these conditions, no voltage will appear across the neutral points 47, 48 of the bridge network, and the latter is therefore in balance. With the bridge now in a balanced state, variation in intensity of the light from source 33 will have no effect upon the accuracy of operation of the apparatus.

A conductor 51 leads from point 47 to the control grid 42a of tube 42, and conductor 52 leads from point 48 on the bridge to control grid 43a of tube 43. The cathodes 42b and 43b of the tubes 42 and 43, respectively, are tied together and connected to the negative terminal of battery 40. It is thus seen that resistor 44 is connected in the cathode-grid circuit of tube 42, and the resistor 45 is similarly connected in the cathode-grid circuit of tube 43.

The anodes 42c and 43c of tubes 42, 43 are connected to opposite ends of a load resistor 53. This latter resistor is connected in series with a variable grid biasing potentiometer 54 to the cathode-grid circuit of tube 55, the cathode being indicated by 55a and the grid by 55b. The anode 55c of tube 55 is connected to a plate resistor 56, and the circuit elements are such that maximum current flows in the anode-cathode circuit of tube 55, and hence also through resistor 56, when no light from the lamp 33 as reflected by the mirrored surface 22 falls on the photo-cell 31b. The voltage drop across resistor 56 is then at a maximum. The drop across the plate resistor 56 is applied through resistor 57 to the screen grid 58a of an oscillator tube 58 which is a 6L6 operated at a frequency of two megacycles. The circuit for the oscillator 58 is constituted by a tuned grid component which includes inductance 59 and variable condenser 60, and a tuned plate circuit which comprises a plate inductance 61 and variable condenser 62. Resonance of the grid plate circuit of the oscillator 58 is indicated by a flashlight bulb 63 which is energized by a single loop 64 around plate inductance 61. A coil 65 for heating the mirrored surface 22 of cap 21 by induction is placed over the cap 21 as shown. The high frequency magnetic field produced in the coil threads through the cap 21 causing the flow of eddy currents therein. Since these currents tend to flow on the surface, substantially only the mirrored surface portion 22 of the cap 21 is heated. Connected in circuit with coil 65 is a radio frequency ammeter 66, a variable condenser 67, and an inductance 68 which is coupled to the plate inductance 61. The series connected condenser 67 is provided for tuning the circuit of the heating coil 65 to resonance which condition is indicated by maximum deflection of the ammeter 66.

The frequency of the heating current should be so chosen that the effective depth of penetration of the eddy currents satisfy a condition of minimum heat dissipation with accurate thermocouple indication. For a cap member 21 of the size described, a frequency of two megacycles proved quite satisfactory.

*Operation*

The bridge network containing photo-cells 31a and 31b, and door 38 are adjusted until the milliammeter 71 connected across the neutral points 47, 48 of the bridge reads zero. Under this condition, the grid-cathode circuits of the amplifiers 42 and 43 have the same bias, and hence there will be no difference of potential between the end terminals of resistor 53.

The two-megacycle oscillator 58 is next tuned to resonance. This condition will be reached when lamp 63 reaches its maximum brilliance.

The load circuit controlling heater coil 65 is then tuned until ammeter 66 reaches a maximum.

After the above adjustments have been made, the solid $CO_2$ or any other suitable type refrigerant is placed in the coolant chamber 11, and the equipment is now ready for operation for ascertaining the humidity of the air passed through chamber 12.

The temperature of the cap 21 is now seen to be controlled by two factors. One is the heating effect from the coil 65 and the other, the cooling effect of the $CO_2$ 18, taking heat away from cap 21 by conduction through rods 16 and 17. It was previously explained that with no condensation on the mirrored face 22, the beam of light passes by the edge of photo-cell 31b along path a. However, when condensation on face 22 begins to take place, the light beam from lamp 33 is dispersed upon reflection from the mirrored face 22, and some of the light now passes along path b into the photo-cell 31b. The bridge circuit including photo-cells 31a, 31b and resistors 44, 45 now becomes unbalanced, and a voltage appears across bridge terminals 47, 48. This voltage is then impressed across the grids 42a—43a of tubes 42 and 43, respectively, and changes the drop across load resistor 53 driving grid 55b more negative with respect to cathode 55a. This, in turn, decreases the current flow in the anode-cathode circuit of tube 55 and decreases correspondingly the voltage drop across resistor 56. This increases the voltage on the screen grid 58a of oscillator tube 58, thereby increasing the amplitude of the current or oscillation appearing across the tuned output circuit comprising capacitor 62 and coil 61. This, in turn, causes an increase in the high frequency (2 megacycles) alternating current flowing through coil 65 and increases the heating of the mirrored surface 22 until the condensation thereon begins to evaporate. As evaporation progresses, the dispersion of light on the mirrored surface 22 also decreases. Less and less light now falls on photo-cell 31b, and the bridge circuit is brought more and more into a balanced state. A reverse effect is then produced on resistors 53 and 56, thus decreasing the voltage on screen grid 58a of oscillator 58 and hence also the current flow in coil 61 and through heating coil 65. When the temperature of the surface 22 of a cap 21 thereby is so reduced that condensation begins to form again, light once again begins to fall on photo-cell 31b, and the cycle is repeated.

This process of alternate heating and cooling of the surface portion 22 is substantially continuous. It is evident that the result is that mirrored surface 22 is maintained at a point of equilibrium where the amount of heat induced in cap 21 from coil 65 substantially balances the amount of heat taken away from cap 21 by conduction through rods 16 and 17 so that the temperature of mirrored surface 22 is maintained substantially at the dew-point of the atmosphere in chamber 12. As the moisture content of this atmosphere changes, the temperature of the condensation will likewise vary and cause the equilibrium point to shift and the temperature of the mirrored surface 22 to vary accordingly. As previously explained, thermocouple 23 imbedded in cap 21 immediately beneath the mirrored surface 22 measures the temperature thereof and may be recorded by conventional recording apparatus 26.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention described herein may be manufactured and used by or for the Government of the United States of America for governmental purposes without the payment of any royalties thereon or therefor.

We claim:

1. A dew-point type hygrometer comprising, a mirror, a heat sink therefor, a heat conducting element extending from said mirror into said sink, a light source, a photo-cell, said light source being arranged to direct light towards said photo-cell by reflection from said mirror and in such manner that the amount of light falling on said photo-cell when said mirror is wet differs from that falling on said photo-cell when said mirror is dry, a coil extending around said mirror only, means to energize said coil with high frequency current to thereby heat the surface of said mirror by induction, and circuit means including said photo-cell for controlling operation of said mirror heating means.

2. A dew-point type hygrometer comprising, a mirror, a heat sink therefor, a heat conducting element extending from said mirror into said sink, a light source, a photo-cell, said light source being arranged to direct light towards said photo-cell by reflection from said mirror and in such manner that more light from said light source strikes the photo-cell when said mirror is wet than when it is dry, a coil surrounding only said mirror in proximity to the surface thereof, means to energize said coil with high frequency current to thereby heat said mirror by induction, and circuit means including said photo-cell for controlling operation of said mirror heating means.

3. A dew-point type hygrometer comprising, a mirror, a heat sink therefor, a light source, a first photo-cell, said light source being arranged to direct light towards said first photo-cell by reflection from said mirror and in such manner that the amount of light falling on said photo-cell when said mirror is wet differs from that falling on said photo-cell when said mirror is dry, a coil associated with said mirror, means to energize said coil with high frequency current to thereby heat said mirror by induction, a second photo-cell, means connecting said first and second photo-cells in a bridge, and means connecting the output of said bridge to control operation of said mirror heating means.

4. A dew-point hygrometer comprising, a mirror, a heat sink therefor, a light source, a first photo-cell, said light source being arranged to direct light towards said photo-cell by reflection from said mirror and in such manner that the amount of light falling on said photo-cell when said mirror is wet differs from that when said mirror is dry, a coil associated with said mirror, means to energize said coil with high frequency current to thereby heat said mirror by induction, a second photo-cell, a bridge circuit, said bridge circuit including said photo-cells in opposite branches thereof, and means connecting the output of said bridge circuit to control operation of said mirror heating means.

5. A dew-point type hygrometer comprising, a mirror, a heat sink therefor, a light source, a first photo-cell, said light source being arranged to direct light towards said photo-cell by reflection from said mirror and in such manner that the amount of light falling on said photo-cell when said mirror is wet differs from that when said mirror is dry, a coil associated with said mirror, means to energize said coil with high frequency current to thereby heat said mirror by induction, a second photo-cell, a bridge circuit, said bridge circuit including said photo-cells in different branches thereof, means connecting the output of said bridge circuit to control operation of said mirror heating means, and means directing a relatively small amount of light from said source into said second photo-cell to thereby compensate for stray light falling on said photo-cell from said light source.

FRANK A. FRISWOLD.
RALPH D. LEWIS.

REFERENCES CITED

The following references are of record in the file of this patent:

UNITED STATES PATENTS

| Number | Name | Date |
|---|---|---|
| 2,059,976 | Stargardter | Nov. 3, 1936 |
| 2,268,785 | Thornthwaite | Jan. 6, 1942 |